(12) United States Patent
Zakel et al.

(10) Patent No.: US 7,829,817 B2
(45) Date of Patent: Nov. 9, 2010

(54) DEVICE FOR REMOVING SOLDER MATERIAL FROM A SOLDERED JOINT

(75) Inventors: Elke Zakel, Falkensee (DE); Paul Kasulke, Berlin (DE); Oliver Uebel, Berlin (DE); Lars Titerle, Berlin (DE)

(73) Assignee: Pac Tech-Packaging Technologies GmbH, Nauen (DE)

( * ) Notice: Subject to any disclaimer, the term of this patent is extended or adjusted under 35 U.S.C. 154(b) by 0 days.

(21) Appl. No.: 10/398,784

(22) PCT Filed: Oct. 2, 2001

(86) PCT No.: PCT/EP01/11418
§ 371 (c)(1),
(2), (4) Date: Aug. 4, 2003

(87) PCT Pub. No.: WO02/28582
PCT Pub. Date: Apr. 11, 2002

(65) Prior Publication Data
US 2004/0026383 A1 Feb. 12, 2004

(51) Int. Cl.
*B23K 26/00* (2006.01)
(52) U.S. Cl. .............................. 219/121.6; 219/121.65; 228/264; 228/19
(58) Field of Classification Search ................ 228/264, 228/19; 219/121.6, 121.65
See application file for complete search history.

(56) References Cited

U.S. PATENT DOCUMENTS

| | | | | |
|---|---|---|---|---|
| 3,987,954 A | * | 10/1976 | Litt | 228/20.5 |
| 5,560,531 A | * | 10/1996 | Ruszowski | 228/19 |
| 5,579,979 A | * | 12/1996 | Kurpiela | 228/6.2 |
| 6,119,919 A | * | 9/2000 | Kasulke | 228/119 |
| 6,224,180 B1 | * | 5/2001 | Pham-Van-Diep et al. | 347/2 |
| 6,550,669 B1 | * | 4/2003 | Walz et al. | 228/264 |

FOREIGN PATENT DOCUMENTS

| | | |
|---|---|---|
| DE | 32 08 626 A1 | 9/1983 |
| DE | 38 22 097 A1 | 1/1990 |
| DE | 39 31 401 A1 | 3/1991 |
| DE | 41 43 414 A1 | 7/1993 |
| EP | 0 635 329 A1 | 1/1995 |
| JP | 1-133672 * | 5/1989 |
| JP | 2-18990 * | 1/1990 |
| WO | WO 98/57774 A1 | 12/1998 |

OTHER PUBLICATIONS

Kaskule, Paul, English Translation of WO 98/57774, 17 pages, Dec. 1998.*
Patent Abstracts of Japan, Sucking Jig for Solder, No. JP 01133672, published May 25, 1989, Hitachi.

* cited by examiner

*Primary Examiner*—M. Alexandra Elve
(74) *Attorney, Agent, or Firm*—Ralph H. Dougherty

(57) ABSTRACT

In a basic variant of a soldering device whereby a laser device is used for melting solder material (3), a protective device is provided which protects the laser lens system (22) from suctioned liquid solder material. Protection of the laser lens system can be achieved by a transverse flow from an inlet channel (23) into an outlet channel (24) and/or by a diaphragm (39) arranged in front of the laser lens system.

5 Claims, 7 Drawing Sheets

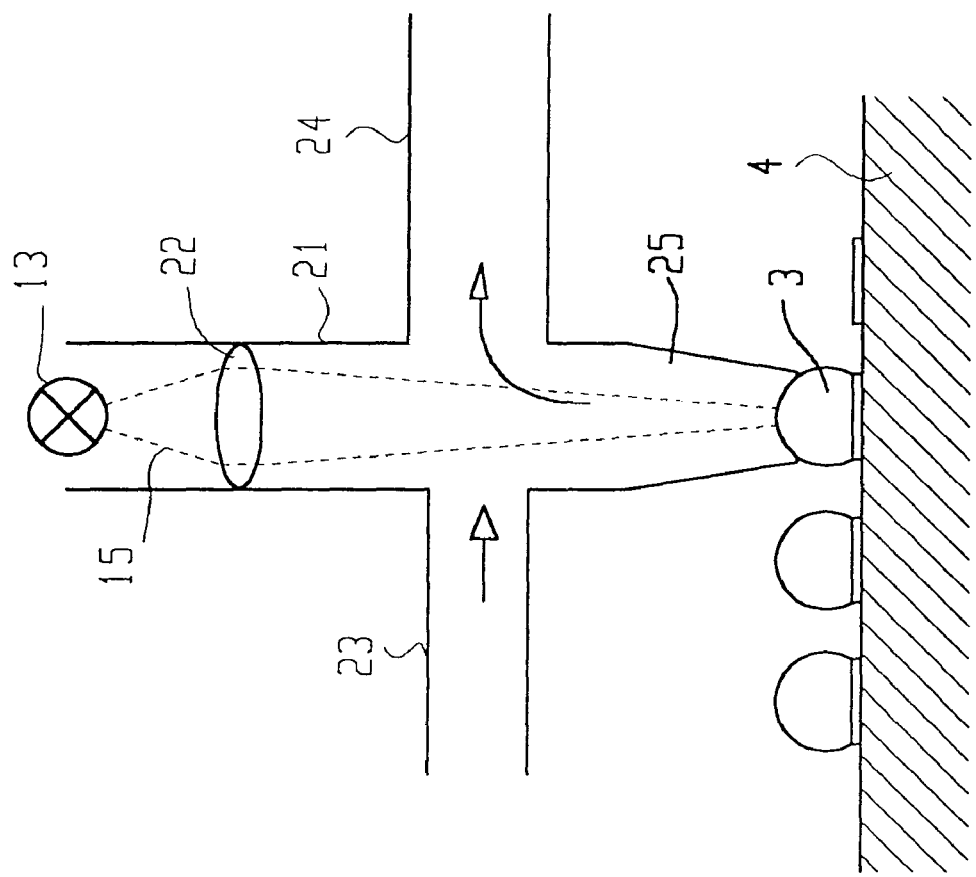

DEVICE FOR REMOVING SOLDER MATERIAL FROM A SOLDERED JOINT

The invention relates to a device for removing solder material from a soldered joint in accordance with the introductory part of patent claim 1.

WO 98/57774 A1 discloses a soldering device which can be used to remove solder material from a defective soldered joint and then to produce a flawless soldered joint. This device has a tubular capillary piece which is open at one end and placed on the defective soldered joint. Provided in the capillary piece is a laser lens system which can focus a laser beam on the defective soldered joint for melting the soldered joint. Two channels branch off from the capillary piece, a pressure connection and a channel connected with a collecting receiver. In order to remove a defective soldered joint, the solder material is first melted there by means of laser light. A vacuum is then generated through the pressure connection inside the capillary piece and the liquid solder material is sucked from the soldered joint and conveyed by a vacuum into the collecting receiver.

To ensure proper functioning, the laser device, particularly the laser lens system must be in flawless condition.

The object of the invention is to create an improved device for removing solder material from a soldered joint, whereby proper functioning of the device is to be improved in particular.

The invention is based on the idea of providing a soldering device in which a laser device is used for melting the solder material with a protection device for protecting the laser lens system from the suctioned liquid solder material.

Protection of the laser lens system can be achieved by a flowing motion in the capillary piece which ensures that the suctioned solder material does not impinge the laser lens system, but rather is transported by "air conveyance" into an outlet channel. To this end, a negative pressure generator is provided which suctions the removed solder material into the outlet channel.

To generate a transverse flow in the capillary piece, an inlet channel is provided in addition to the outlet channel or "suction channel", gas flowing through the inlet channel into the capillary piece. The inlet channel and the outlet channel can, for example, be coaxial, that is, flowing into the capillary piece on opposite sides, and the two channels can have different cross-sections. The inlet channel flowing transversely into capillary piece gives rise to a transverse flow which reliably diverts the suctioned solder material into the outlet channel. A negative pressure generator such as a vacuum pump can be connected to the outlet channel in order to generate a sufficiently high negative pressure.

In addition, the two channels can be tapered toward the capillary piece in their "connection areas" which causes the flow between the inlet channel and the outlet channel to approximate that of a venturi nozzle, generating a high transverse flow velocity and thus a relatively high degree of vacuum.

The inlet channel and the outlet channel can also be staggered relative to each other in the longitudinal direction of the capillary tube. In this case, the inlet channel can be arranged between the laser lens system and the outlet channel. In this way, a "reserve pressure head" forms in front of the laser lens system, that is, a flow running counter to the movement of the suctioned solder material which prevents impingement of the laser lens system.

Alternatively or in supplement thereof, protection of the laser lens system can also be achieved by a "diaphragm" which is arranged in front of the laser lens system during the process of suctioning of the liquid solder material. The diaphragm can be produced from an optically transparent material so that the laser light can reach the soldered joint also during the suctioning process.

A further development of the invention provides for an actuating device such as a swivel motor or a linear motor which places the diaphragm in front of the laser lens system when solder material is suctioned, the diaphragm being opened or "moved out" of the capillary tube for melting the soldered joint.

The device in accordance with the invention can either be integrated into a separate "repair head" or into a "combination soldering head" as described in WO 98/57774 A1 mentioned in the beginning, which is suitable both for removing a defective soldered joint and for producing a soldered joint. In this case, the capillary piece also has a feed channel for soldering pellets and can be switched from a negative pressure operation for suctioning solder material to a positive pressure operation for applying solder material to a workpiece.

In a further development of the invention, the inside diameter of the capillary can be smaller in its opening area, that is, in the area facing the soldered joint to be suctioned than the inside diameter of he "overlying" capillary areas. Preferably, the diameter of the capillary in the opening area is equal to or less than the diameter of the soldered joint to be suctioned.

In a further development of the invention, the longitudinal ratio of the "opening of the capillary piece to the outlet channel and/or the inlet channel" to "outlet channel and/or inlet channel to the laser lens system" is somewhat larger than or equal to 80:20 or 4:1, that is, the laser lens system has a certain minimum distance from the transverse channels.

In the soldering device described above, the solder material to be removed from the soldered joint is irradiated directly by the laser light. The laser energy absorbed melts the solder material which is then suctioned away by a "vacuum" or negative pressure.

Alternatively or in supplement to melting by means of a laser, provision can be made for the solder not to be heated directly, but rather the capillary tip to approach the solder material assumes two functions, that is, those of a melting device and of a suctioning device. The solder material can thus also be melted solely by means of the suctioning device or the capillary, that is, without laser energy.

In a further development of the invention, the capillary is heated, for example, by laser energy, the solder material being melted with the approach of the hot capillary. Alternatively, a tool or heating device can be provided around the capillary for the transfer of thermal energy to the capillary.

Furthermore, a tool or device can be arranged around the capillary, the former being itself heated by a heating device such as an electrical resistance heater, and the thermal energy absorbed being transferred to the capillary. An electrical resistance heater and/or heating gas can be used for heating the tool and/or the capillary.

It is also possible to remove the soldered joint in a conventional way by means of a separately heated tool, particularly a kind of "soldering iron", the tool being heated by an electrical resistance heater, heating gas, etc.

In a further development of the invention, use is made of a "combination of laser energy and vacuum". Provided for this purpose is a double capillary with an outer capillary tube and an inner capillary tube preferably arranged concentrically thereto. Inert gas can be supplied to the soldered joint through an "annular space" between the two capillary tubes. The optionally heated inert gas, has the function of preventing oxidation of the soldered joint "to be repaired", thus facilitating another application of solder material. Laser energy is supplied through the inner capillary tube for melting the solder material. Preferably, the inert gas supplied through the annular space is heated which avoids a cooling of the soldered joint heated by laser energy.

An alternative possibility is to melt the solder material solely by supplying heated gas, that is, without laser energy. Melting of the solder material can also be achieved solely through heating of the capillary in the area of the capillary opening which will then function as a "soldering iron".

The invention is described in more detail with example embodiments related to the drawing in which:

FIG. 2 represents a first example embodiment of the invention with coaxially arranged flow channels;

Figure 1:
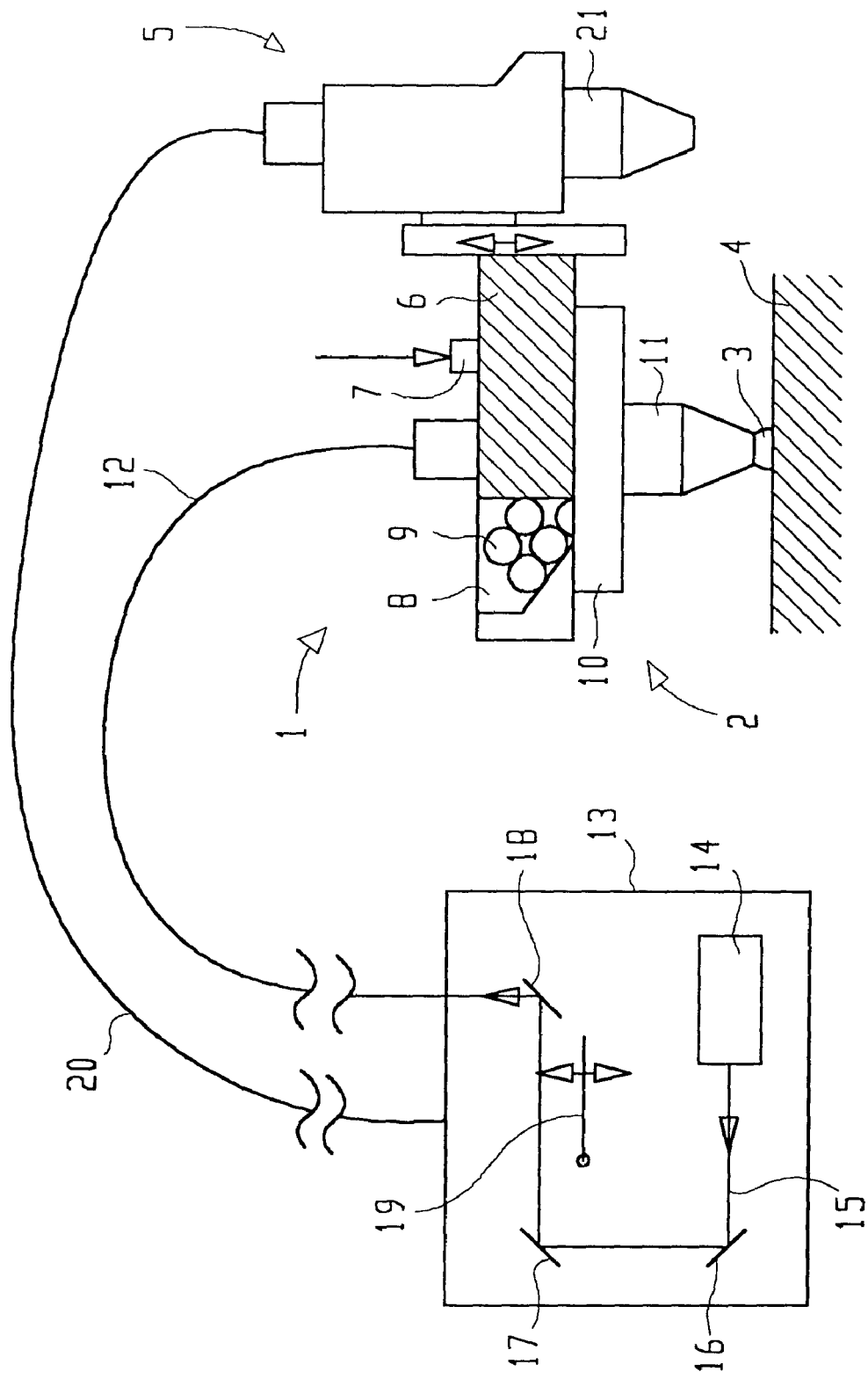
FIG. 1 is a schematic representation of a soldering device with a soldering head and a repair head.

FIG. 1 shows a soldering device 1 with a soldering head 2 for the production of a soldered joint 3 on a workpiece 4. The soldering device 1 also has a repair head 5 which can be used to remove defective or faulty soldered joints from the workpiece 4. The soldering head 2 is inserted in a retainer 6 which has a protective gas connection 7 and a supply bin 8 for receiving solder pellets 9. To produce a soldered joint 3, a solder pellet 9 is moved by a conveying device 10 (shown here only schematically) into the interior of a capillary piece 11 of the soldering head 2. On its end facing the workpiece 4, the capillary piece 11 has an opening through which the solder material can be discharged. However, the solder pellet 9 to be applied must first be melted. To this end, a laser lens system (not shown) is provided in the capillary piece 11, said system focusing the laser light on the solder pellet 9 to be applied. The laser lens system is connected through an optical waveguide 12 with the laser device 13. The laser device 13 has a laser 14 which generates a laser beam 15 fed through deviation mirrors 16-18 into the optical waveguide 12. Also provided is a swivel mirror 19 with which the laser beam can be interrupted or fed in a swivel position into a further optical waveguide 20 which is connected with a capillary piece 21 of the repair head 5. The repair head also has a laser lens system which focuses the laser energy supplied onto a soldered joint to be removed. To remove a soldered joint, the repair head 5 is placed over the soldered joint which is explained in more detail in connection with the figures following.

In order to produce a soldered joint, a positive pressure is generated through the protective gas connection 7 in the capillary 11 pressing the liquid solder material onto the workpiece 4. To remove a soldered joint, a negative pressure is generated through the protective gas connection 7 suctioning the previously melted liquid solder material from the workpiece 4.

FIG. 2 is a schematic representation of the capillary piece 21 of the repair head 5 which can be used to remove the soldered joint 3 from the workpiece 4. The capillary piece 21 tapers toward the soldered joint 3, the diameter of the opening provided at the free end of the capillary piece 21, that is, the diameter of the capillary piece at the end facing the soldered joint, being smaller than the diameter of the soldered joint 3.

Arranged in the capillary piece 21 is a laser lens system 22 (shown here only schematically) which focuses the laser light 15 generated by the laser device 13 onto the soldered joint to be removed which can melt the solder material.

The capillary piece 21 also has an inlet channel 23 and an outlet channel 24. A gas such as inert gas or air flows through the inlet channel 23 into the interior of the capillary piece 21 and from there into the outlet channel 24. Similar to the action of an air jet pump, this transverse flow gives rise in the bottom area 25 of the capillary piece 21 to a negative pressure which suctions the melted solder material upwards into the capillary piece 21 and then carries it away through the outlet channel 24.

It would suffice to generate a negative pressure in the outlet channel 24 for suctioning the liquid solder material, but the result of this can be that the suctioned material will be carried away only in part and some of it can impinge on the laser lens system which is undesirable. Contamination of the laser lens system would lead to a "darkening" and thus to a deterioration of the melting capacity.

In order to avoid this, the inlet channel 23 provided coaxially here with the outlet channel 24 generating a sufficiently strong transverse flow in the capillary piece which ensures that all the suctioned solder material enters the outlet channel 24 and does not impinge on the laser lens system 22.

To avoid a counter-flow in the bottom area 25 of the capillary piece 21, provision is made here so that the cross-section of the inlet channel 23 is smaller than the cross-section of the outlet channel 24. Therefore, the gas coming from the inlet channel 23 flows almost in full directly into the outlet channel.

Since the diameter of the opening of the capillary piece is smaller than the diameter of the soldered joint 3, a good "seal" is achieved between the capillary piece and the soldered joint 3, particularly at the beginning of the suctioning procedure, this giving rise to a sufficiently high negative pressure in the capillary piece which is enough to overcome the wetting tension of the solder material, that is, for suctioning.

Figure 3:
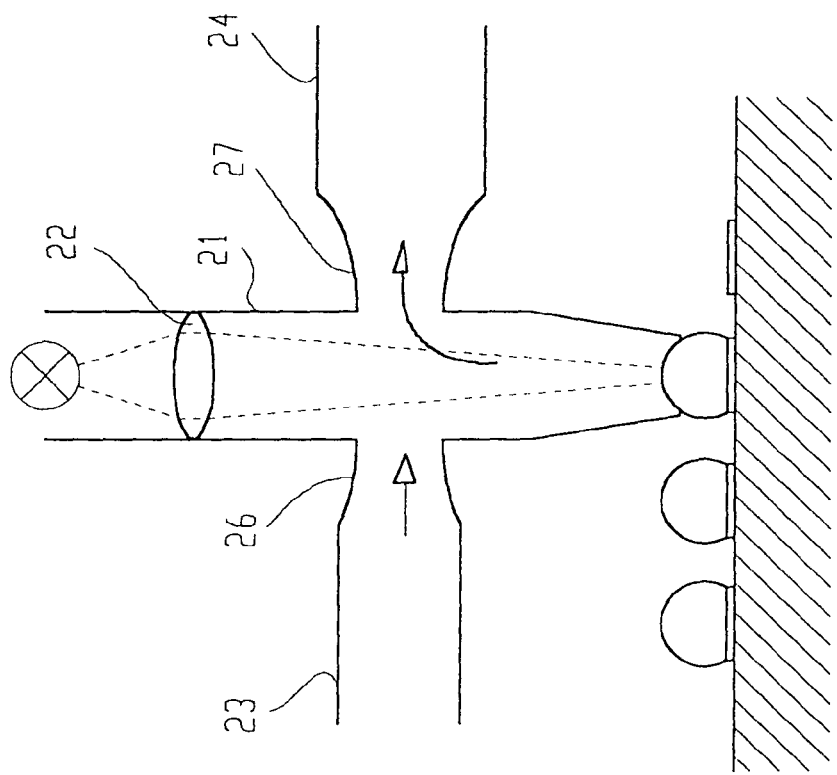
FIG. 3 shows a variant of FIG. 2, the flow channels having the shape of a venturi nozzle.

FIG. 3 shows a variant of FIG. 2 wherein the connection areas 26 and 27 of the inlet channel 23 and the outlet channel 24 taper toward the capillary piece 21. Similar to the action with a venturi nozzle, this necking gives rise to a flow acceleration, that is, the transverse acceleration toward the outlet channel 24 is still greater. Thus, the negative pressure in the capillary tube 21 is also greater. Because of the stronger transverse flow toward the outlet channel 24, the laser lens system 22 is better protected from solder material. Similar to the case with the example embodiment in FIG. 2, the cross-section of the inlet channel 23 is somewhat smaller than the cross-section of the outlet channel 24 here as well.

Figure 4:
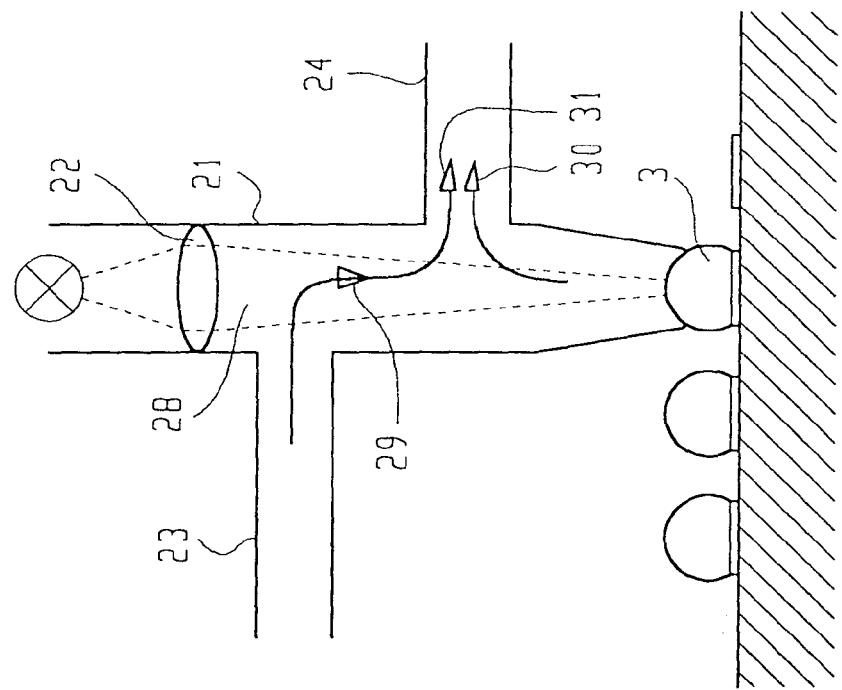
FIG. 4 shows an example embodiment with axially staggered channels.

FIG. 4 shows a variant of the invention wherein the inlet channel 23 is in a staggered arrangement toward the laser lens system. In one area 28 of the capillary piece 21 lying between the inlet channel 23 and the outlet channel 24, a "counter-flow" forms in the direction of the soldered joint 3 (indicated by arrow 29). This counter-flow gives rise to an "air-cushion" in front of the laser lens system 22 which prevents an upward migration, that is, an impingement of liquid solder material on the laser lens system 22. At the level of the outlet channel 24, this "counter-flow" becomes a transverse flow which moves the suctioned solder material out of the capillary piece 21 (indicated by arrows 30 and 31).

Figure 5:
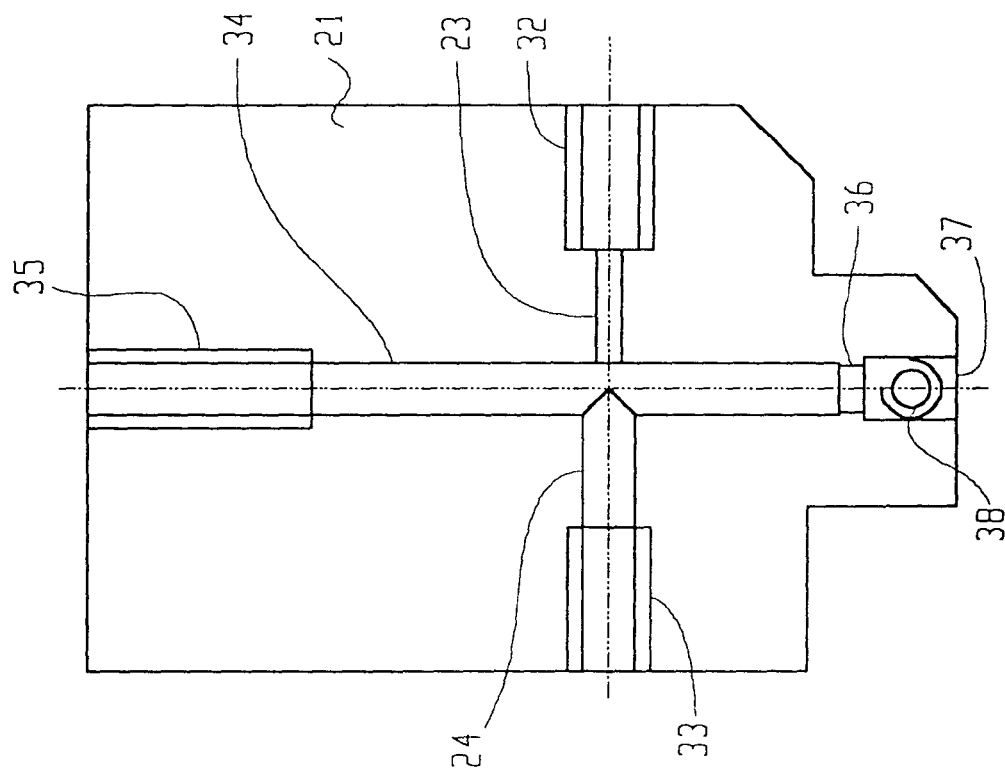
FIG. 5 shows a capillary piece similar to that in FIG. 2.

FIG. 5 shows an example embodiment of the capillary piece 21 where the inlet channel 23 and the outlet channel 24 are in a coaxial arrangement, the cross-section of the inlet channel being smaller than that of the outlet channel here as well. The inlet channel 23 and the outlet channel 24 have internal threads 32 and 33 for the connection of connecting lines. The inlet channel 23 and the outlet channel 24 empty into a capillary channel 34 which also has an internal thread 35 for connection to the laser lens system (not shown). The capillary channel 34 has a necking 36 in the bottom area and a transverse bore with internal thread 38 in the area of the suction port 37.

Figure 6:
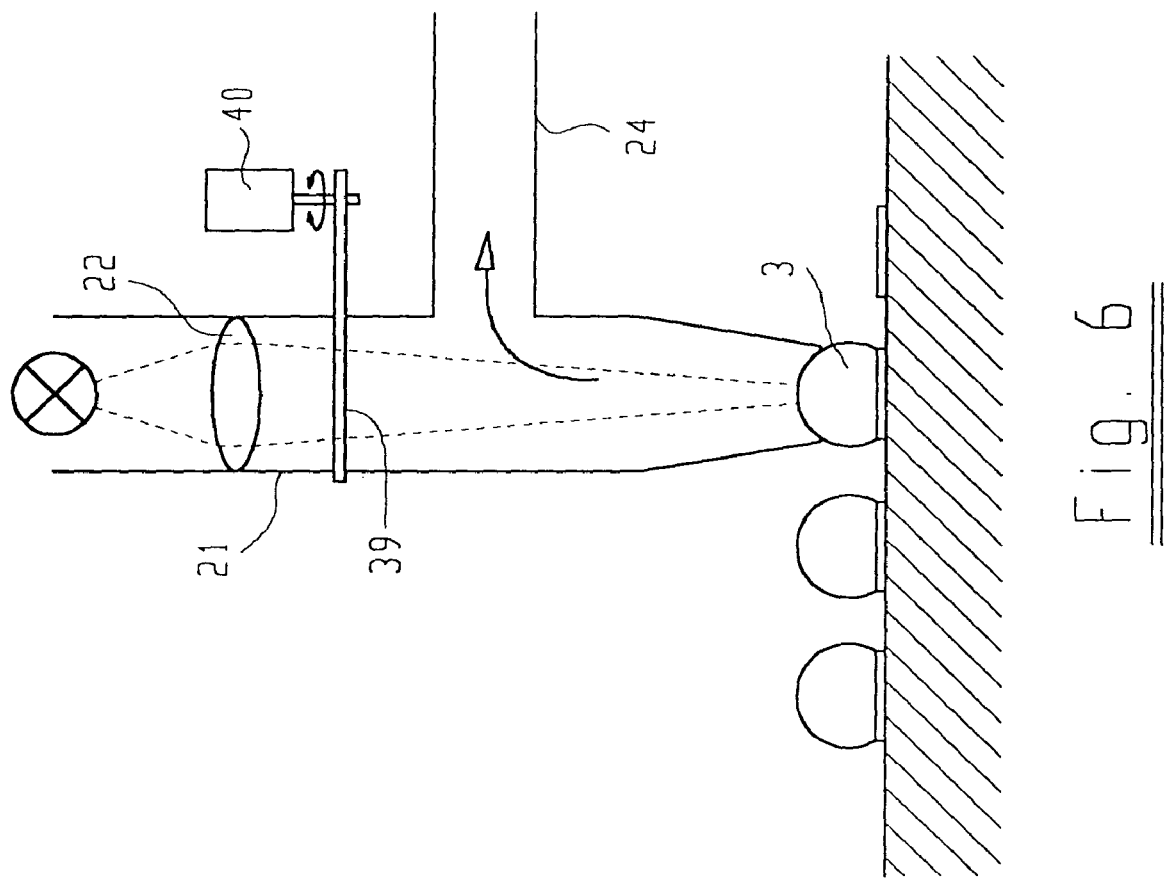
FIG. 6 shows a variant with a diaphragm.

FIG. 6 shows an example embodiment in which a diaphragm 39 is provided for protection of the laser lens system 22, said diaphragm swivelling here by a swivel motor 40 into the capillary piece 21. Unlike the example embodiments in FIGS. 2-5, there is no inlet channel here, only the outlet channel 24 in which the negative pressure is generated. Should the suctioned solder material not go in full into the outlet channel 24, it will be captured at the diaphragm at the latest.

The diaphragm 39 can be made, for example, of a transparent material so that the soldered joint 3 can be radiated with laser light even in the "swivelled-in" condition, that is, during suctioning.

Naturally, it is possible to provide for a diaphragm in addition in the example embodiments of FIGS. 2-5 as well.

Figure 8:
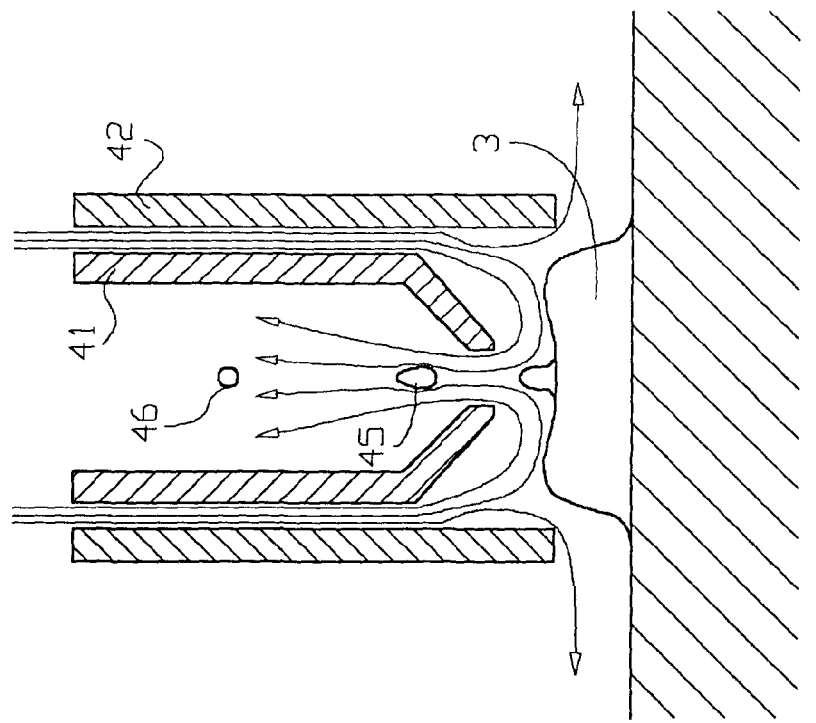
FIGS. 7 and 8 show a variant with double capillary.
Figure 7:
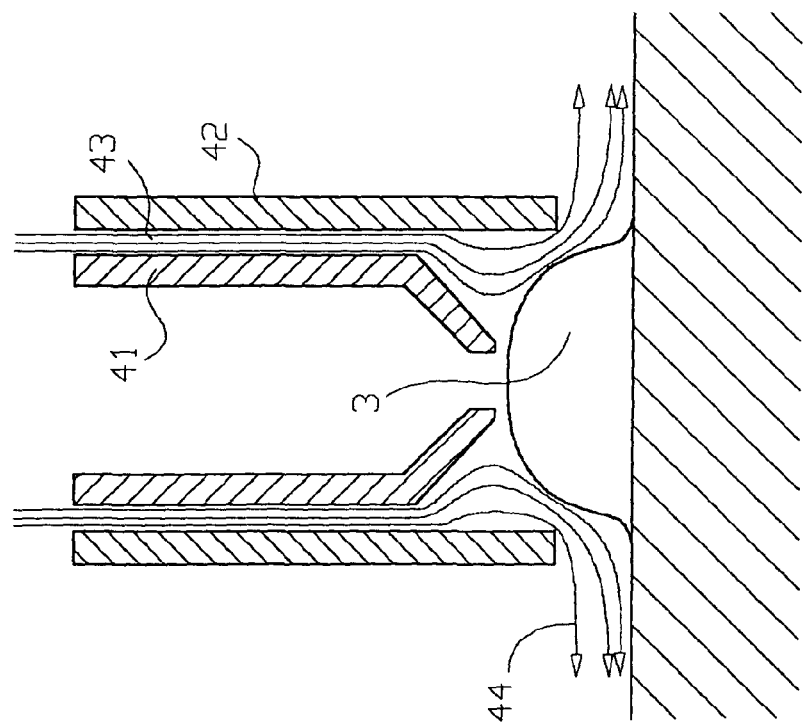

FIGS. 7 and 8 show an example embodiment with a so-called "double capillary".

The double capillary consists of an inner capillary tube 41 and an outer cylindrical capillary tube 42 in a concentric arrangement. An annular cylindrical space 43 is located between the two capillary tubes 41 and 42. The inner capillary tube 41 corresponds basically in shape and structure to that in FIGS. 1 to 6. The outer capillary tube is somewhat longer than the inner capillary tube 41, that is, it projects a little over the opening of the inner capillary tube 41.

In FIG. 7, the soldered joint 3 is supplied through the annular space 43 with inert gas or protective gas, which is indicated here schematically by flow lines 44. The inert gas 44 flows over the surface of the soldered joint 3 and then primarily laterally next to the soldered joint 23 out of the double capillary.

Preferably, use is made of a pre-heated inert gas. The inert gas serves on the one hand for protecting the soldered joint 3 from oxidation. In addition, the soldered joint is supplied with heat through the inert gas. The inert gas can be heated so strongly that the soldered joint is heated up locally by the inert gas flowing around it, even to the melting point. With a sufficiently high inert gas temperature, the soldered joint can be melted even solely by hot inert gas, that is, without additional supply of heat by a laser.

Alternatively or in supplement thereof, however, melting by laser light can be provided as in the example embodiments shown in FIGS. 1 to 6. Heating can be carried out in a way that the laser light is "shot" in pulses onto the soldered joint 3 through the interior of the inner capillary tube 41.

Moreover, alternatively or in supplement thereof, a heating device (not shown) can be provided for heating up the tool, that is, the capillary tube on the inside and/or on the outside. Speaking more specifically, the inner capillary tube 41 and/or the outer capillary tube 42 are heated. In this case, melting of the solder material can be achieved by the hot capillary acting alone or in support. A corresponding heating of the capillary tube is naturally possible also in the example embodiments in FIGS. 1 to 6.

It can be said in summary that heating of the solder material is possible by means of:
a) Hot gas, particularly hot inert gas, or
b) Radiation with laser light, particularly pulsed radiation, or
c) A heating tool, particularly by heating the capillary tube, or
d) Combinations of the "heating variants" a) b)? and c).

If the soldered joint 3 (as shown in FIG. 7) is heated sufficiently, that is, until the solder material is melted, the solder material will be suctioned away.

This is shown in FIG. 8. To this end, a negative pressure or vacuum is generated inside the inner capillary tube 41, as was already described in detail in connection with FIGS. 1 to 6. At the same time, the soldered joint 3 is kept in a liquid condition by hot inert gas and/or by laser light and/or by heating the capillary tubes 41 and 42. Suctioning of the solder material is shown here schematically by solder pellets 45, 46 which are conveyed upward in the flow of air.

Liquefaction of the solder material thus must take place before and/or during the suctioning process, that is before and/or during application of the vacuum inside the inner capillary tube 41, for example, by a pulsed laser or through a heated tool (capillary). Even with "pulsed heating", the heating process and application of the vacuum must be controlled in a way that the solder material is liquefied precisely at the time of application of the vacuum. With regard to the time sequence of application of the vacuum, there are the following possibilities:
a) The inert gas and the vacuum are applied at the same time. In this case, the solder material must already be liquid.
b) The inert gas and the vacuum are applied at staggered times.

Figure 9:
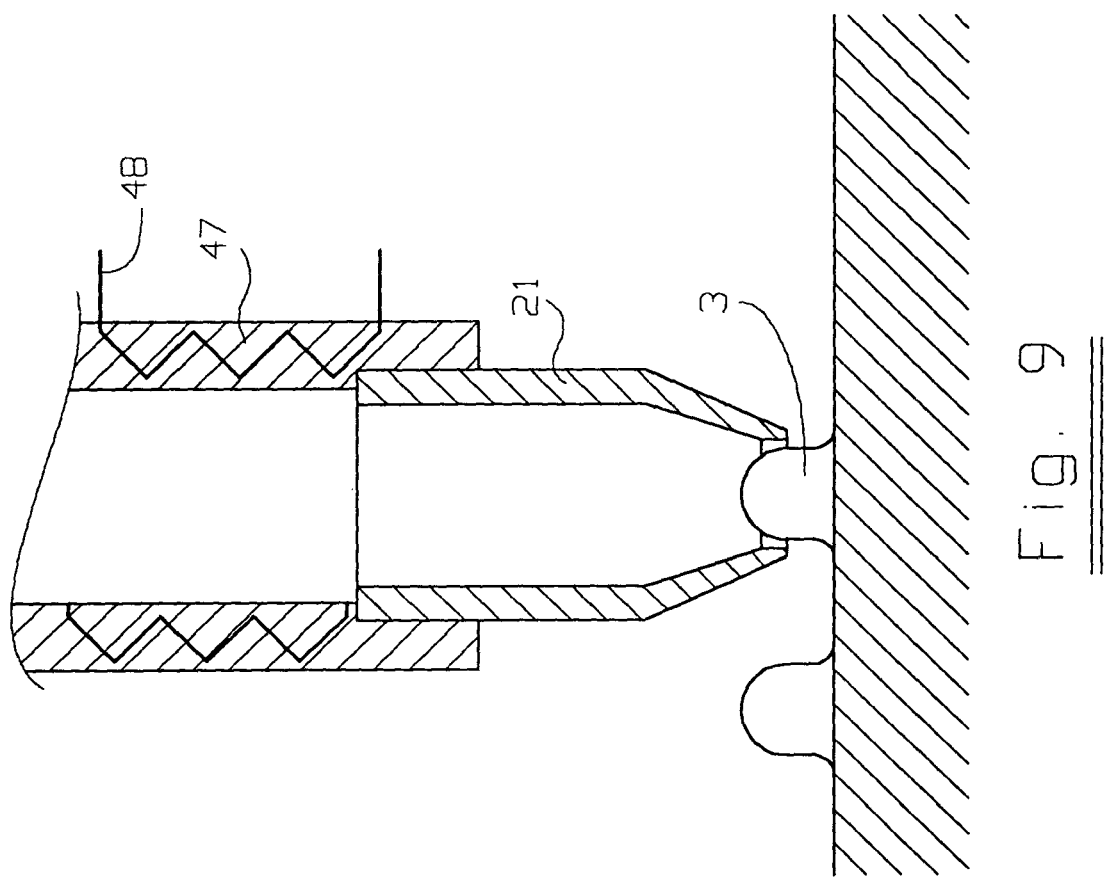
FIG. 9 shows a variant with heated capillary tip.

FIG. 9 shows an example embodiment where the capillary 21 is in thermal contact with a cylindrical element 47 which partially surrounds the capillary 21 here. Provided in the cylindrical element 47 is a heating device indicated schematically here by a heating spiral 48. Thermal energy is supplied through the heating spiral 48 to the cylindrical part 47.

Alternatively, the cylindrical element 47 can also be heated by laser energy. The thermal energy is transferred to the capillary tube 21 and from it to the soldered joint 3 which leads to melting of the soldered joint 3. The soldered joint 3 can also be melted solely by a supply of heat through the capillary 21. Naturally, heat can be supplied in addition by means of laser light.

Moreover, the heating device 48 shown in FIG. 9 can also be provided in the other example embodiments, particularly as shown in FIGS. 7 and 8.

The invention claimed is:

1. Apparatus for removing solder material from a soldered joint with a capillary having a capillary opening, which material is applied to the soldered joint, said apparatus comprising:

a melting device for melting the solder material;

a negative pressure generating device, which generates a negative pressure in the capillary for suctioning the melted liquid solder material from the soldered joint, and an outlet channel leading out of the capillary for evacuating the suctioned solder material from the capillary;

a protective device (23, 24; 39) provided between the capillary opening (37) and the melting device (22), said protective device being adapted to prevent suctioned solder material from reaching the melting device (22), the protective device being formed by an outlet channel (24) and an inlet channel (23) communicating with the capillary (21); and means for supplying a gas under positive pressure to the inlet channel (23);

wherein the inlet channel (23) and the outlet channel (24) direct gas flow transversely across the capillary (21);

wherein the inlet channel (23), and the outlet channel (24), both are tapered in the wherein the cross-section of the inlet channel (23) is smaller than the cross-section of the outlet channel (24); and wherein either the inlet channel (23), or the outlet channel (24), or both are tapered in the form of a nozzle in their areas of connection with the capillary (21).

2. Apparatus as described in claim 1, characterized in that the diameter of the capillary opening (37) is equal to or smaller than that of the soldered joint.

3. Apparatus as described in claim 1, characterized in that the diameter of the capillary is greater than that of the capillary opening.

4. Apparatus as described in claim 1, characterized in that a device is provided for applying solder material to a workpiece (4).

5. Device as described in claim 1, characterized in that the coaxial relationship of the inlet channel and the outlet channel and the relationship of the cross-sections of the inlet channel and the outlet channel define a venturi nozzle, whereby a negative pressure is created at the capillary tip by the venturi nozzle.

* * * * *